US012657152B2

(12) United States Patent
Zhao et al.

(10) Patent No.: US 12,657,152 B2
(45) Date of Patent: Jun. 16, 2026

(54) SIGNAL SENDING METHOD AND APPARATUS, NONVOLATILE READABLE STORAGE MEDIUM, AND ELECTRONIC DEVICE

(71) Applicant: SUZHOU METABRAIN INTELLIGENT TECHNOLOGY CO., LTD., Suzhou (CN)

(72) Inventors: Weikang Zhao, Suzhou (CN); Xianyang Gao, Suzhou (CN); Caikun Yang, Suzhou (CN); Tanlong Ci, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/142,150

(22) PCT Filed: Jun. 17, 2024

(86) PCT No.: PCT/CN2024/099654
§ 371 (c)(1),
(2) Date: Jun. 20, 2025

(87) PCT Pub. No.: WO2025/102727
PCT Pub. Date: May 22, 2025

(65) Prior Publication Data
US 2026/0119438 A1 Apr. 30, 2026

(30) Foreign Application Priority Data
Nov. 17, 2023 (CN) .......................... 202311539045.1

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS 8,331,792 B2 * 12/2012 Jovanovich ............ H04B 10/40
398/135
8,805,196 B2 * 8/2014 Kasprzyk ............... H04B 10/40
398/151

(Continued)

FOREIGN PATENT DOCUMENTS

CN 108959131 A 12/2018
CN 113672539 A 11/2021

(Continued)

*Primary Examiner* — Raymond N Phan
(74) *Attorney, Agent, or Firm* — IPro, PLLC

(57) ABSTRACT

A signal sending method includes: acquiring a first data signal and a first auxiliary signal to be sent to a first opposite-side device, wherein the first data signal is to be sent via PCIe optical-fiber links of a quantity N, that is ≥2; determining a first-signal-intensity sequence corresponding to the first auxiliary signal, wherein the first-signal-intensity sequence includes first signal intensities of a quantity M, that is ≥2; and according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

19 Claims, 5 Drawing Sheets

(56)       References Cited

U.S. PATENT DOCUMENTS

| | | | |
|---|---|---|---|
| 2006/0285803 A1* | 12/2006 | Crews ...................... | G02B 6/43 |
| | | | 385/88 |
| 2009/0052903 A1* | 2/2009 | Mussatt .............. | G06F 13/4045 |
| | | | 398/135 |
| 2013/0129359 A1 | 5/2013 | Zbinden et al. | |
| 2016/0087723 A1 | 3/2016 | Zhang et al. | |
| 2020/0278733 A1 | 9/2020 | Li et al. | |

FOREIGN PATENT DOCUMENTS

| | | |
|---|---|---|
| CN | 114301485 A | 4/2022 |
| CN | 114754689 A | 7/2022 |
| CN | 116527128 A | 8/2023 |
| CN | 117254860 A | 12/2023 |

* cited by examiner

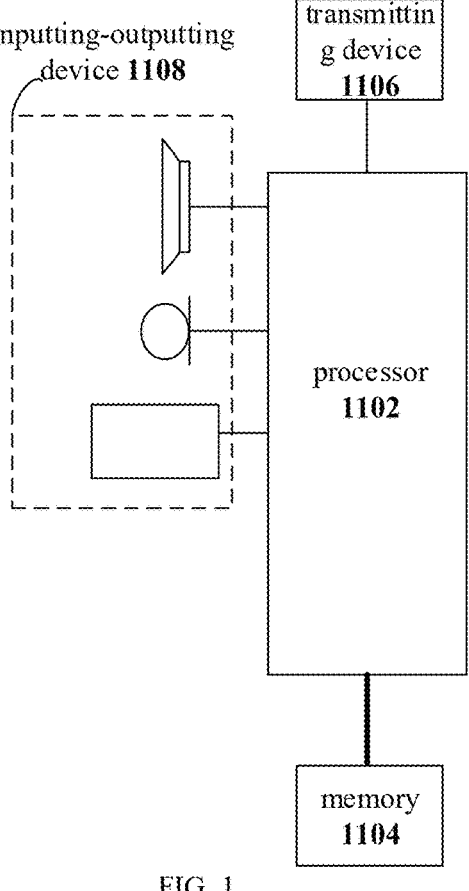

inputting-outputting device 1108 transmittin g device 1106 processor 1102 memory 1104

FIG. 1

--- acquiring a first data signal and a first auxiliary signal that are to be sent to a first opposite-side device, wherein the first data signal is to be sent to the first opposite-side device via PCIe optical-fiber links of a quantity N, wherein N is a positive integer greater than or equal to 2          ⌒ S202 determining a first-signal-intensity sequence corresponding to the first auxiliary signal, wherein the first-signal-intensity sequence comprises first signal intensities of a quantity M, wherein M is a positive integer greater than or equal to 2 and less than or equal to N          ⌒ S204 according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween          ⌒ S206

FIG. 2

Step 1: receiving, by the laser-light driver, a high-speed data signal transmitted by the upstream emitting side, and receiving, by the controller, a low-speed auxiliary signal emitted by the upstream emitting side

Step 2: according to the combination sequence predetermined for the low-speed auxiliary signal, regulating the laser-light driver to control the intensities of the optical signals outputted by each of the channels of the laser generators in the laser-generator array, i.e., regulating the intensities of the optical signals obtained by the photovoltaic conversion of the high-speed signal, to realize a particular light-intensity combination sequence, and subsequently transmitting via the optical fiber

Step 3: receiving, by the photodiode array, the optical signals of unequal amplitudes of the emitting side, subsequently generating photocurrents of unequal amplitudes, subsequently outputting, by the transimpedance amplifier, high-speed data signals of unequal voltage amplitudes, and transmitting the high-speed data signals to the receiving side

Step 4: by the detector, sampling the amplitudes of each of the channels of the high-speed data signals, to obtain a combination sequence of the amplitudes of the data signals, determining and parsing according to a predetermined rule to obtain the low-speed auxiliary signals, and transmitting the low-speed auxiliary signals to the receiving side

FIG. 4 acquiring module — 62 first determining module — 64 first processing module — 66 auxiliary-signal sending apparatus

1 data signal 101
laser-light driver 102
laser-gene rator array 105
controller auxiliary signal

SIGNAL SENDING METHOD AND APPARATUS, NONVOLATILE READABLE STORAGE MEDIUM, AND ELECTRONIC DEVICE

CROSS-REFERENCE TO RELATED APPLICATION

The present application claims the priority of the Chinese patent application filed on Nov. 17, 2023 before the Chinese Patent Office with the application number of 2023115390451 and the title of "SIGNAL SENDING METHOD AND APPARATUS, NONVOLATILE READABLE STORAGE MEDIUM, AND ELECTRONIC DEVICE", which is incorporated herein in its entirety by reference.

FIELD

The embodiments of the present application relate to the field of communication transmission, and particularly relate to a signal sending method and apparatus, a non-volatile readable storage medium and an electronic device.

BACKGROUND

The peripheral component interconnection high-speed bus (Peripheral Component Interconnect Express, referred to for short as PCIe) is a high-speed serial computer expansion-bus standard, and is mainly used to expand the data throughput of a computer system bus and increase the equipment communication speed. With the development of the PCIe protocol, the data transmission speed gradually increases, and the problem of loss of the solution of electric interconnection with copper cables as the transmission medium is increasingly more serious, whereby the distance of the external PCIe interconnection gradually decreases. The optical interconnection, which has a low loss, is currently the optimum solution for external long-distance PCIe interconnection.

The signal transmission of the optical-fiber link is not established by the PCIe protocol. In a general optical-fiber link the transmitted data signal is a high-speed data signal. Besides the high-speed data signal, a PCIe link is further required to transmit a low-speed auxiliary signal, and the auxiliary signal is related to the construction of the PCIe link and the state changing. The traditional copper cables can directly transmit the low-speed auxiliary signals, but, if such a type of the low-speed auxiliary signals is to be transmitted in the optical-fiber link, it is required that the low-speed auxiliary signals can pass through optical modules. Regarding the optical modules, their built-in digital signal processing chips (Digital Signal Processor, referred to for short as DSP) or clock-data recovery chips (Clock Data Recovery, referred to for short as CDR) usually support merely high-speed signals of particular speeds, and cannot transmit such low-speed auxiliary signals.

In order to solve the above problem, currently the following three transmitting methods are frequently employed:

In the first method, a converting chip is used to compile a clock signal into a low-voltage differential signal (Low-Voltage Differential Signaling, LVDS) having a higher speed, which is subsequently transmitted by using independent optical module and optical-fiber link.

In the second method, the PCIe auxiliary signal is transmitted by using a pilot tone modulation technique. In other words, the emitting side, when sending the auxiliary signal, by using a controller, regulates an optical-module laser-light driver in the data link, converts the auxiliary signal into a low-frequency sine or cosine modulated signal of a small amplitude, and superposes into a predetermined corresponding high-speed data signal. An opposite-side optical module can obtain the corresponding auxiliary-signal information after parsing out the modulated signal.

In the third method, a Field-Programmable Gate Array (referred to for short as FPGA) is used to compile the low-speed auxiliary signal to a higher speed, and subsequently redundant laser generators of the optical module are used to perform photovoltaic conversion to the auxiliary signal obtained by the compiling by the FPGA, which is subsequently transmitted via an optical fiber.

However, the methods of processing the auxiliary signal by using a converting chip or a FPGA and subsequently transmitting it via an independent optical-fiber link require additional photovoltaic signal converting devices and optical-fiber channels, which does not only add the additional device cost, but also reduces the effective data bandwidth of the devices. Moreover, the modulation of the auxiliary signals to the respective independent data channels by using the pilot tone modulation technique does not require independent devices and optical-fiber channels. However, such a method reduces the signal-to-noise ratio, and reduces the sensitivity of the receiver of the optical module, which, when the data-signal speed is high, might cause an increased bit error rate, which affects the transmission of the data signals.

The problem in the related art that auxiliary information cannot be transmitted in the PCIe optical-fiber links well has not been provided an effective solution yet.

Therefore, it is necessary to improve the related art to overcome the defect in the related art.

SUMMARY

The embodiments of the present application provide a signal sending method and apparatus, a non-volatile readable storage medium and an electronic device.

According to the first aspect of the embodiments of the present application, there is provided a signal sending method, wherein the method comprises:

acquiring a first data signal and a first auxiliary signal that are to be sent to a first opposite-side device, wherein the first data signal is to be sent to the first opposite-side device via PCIe optical-fiber links of a quantity N, wherein N is a positive integer greater than or equal to 2;

determining a first-signal-intensity sequence corresponding to the first auxiliary signal, wherein the first-signal-intensity sequence comprises first signal intensities of a quantity M, wherein M is a positive integer greater than or equal to 2 and less than or equal to N; and according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

Optionally, the step of determining the first-signal-intensity sequence corresponding to the first auxiliary signal comprises:

acquiring configuration information, wherein the configuration information contains signal-intensity sequences corresponding to different auxiliary signals, wherein the auxiliary signals include the first auxiliary signal, and the signal-intensity sequences include the first-signal-intensity sequence; and based on the configuration information, determining the first-signal-intensity sequence corresponding to the first auxiliary signal.

Optionally, the step of, according to the first-signal-intensity sequence, converting the first data signal into the first optical signals of the quantity N comprises:

by using a laser-light driver, according to the first data signal, determining driving currents of the quantity N;

according to the first-signal-intensity sequence, regulating amplitudes of the driving currents of the quantity M corresponding to the first-signal-intensity sequence among the driving currents of the quantity N, whereby the amplitudes of the driving currents of the quantity M and the first signal intensities of the quantity M have a one-to-one correspondence relation therebetween; and by using a laser-generator array, according to the driving currents of the quantity N, obtaining the first optical signals of the quantity N.

Optionally, the step of, according to the driving currents of the quantity N, obtaining the first optical signals of the quantity N comprises:

obtaining an i-th optical signal among the first optical signals of the quantity N in the following manner, to obtain the first optical signals of the quantity N:

according to data information corresponding to the first data signal carried by an i-th instance of the driving currents and an amplitude of the i-th driving current, modulating a light, to obtain the i-th optical signal.

Optionally, the method further comprises:

in response to second optical signals of the quantity N sent by the first opposite-side device having been acquired, according to the second optical signals of the quantity M that are predetermined among the second optical signals of the quantity N, determining a second-signal-intensity sequence corresponding to the second optical signals of the quantity M; and according to the second-signal-intensity sequence, determining a second auxiliary signal, wherein the second auxiliary signal is an auxiliary signal sent by the first opposite-side device.

Optionally, the step of, according to the second optical signals of the quantity M that are predetermined among the second optical signals of the quantity N, determining the second-signal-intensity sequence corresponding to the second optical signals of the quantity M comprises:

by using a photodiode array, converting the second optical signals of the quantity M into electric-current signals of the quantity M, and by using a transimpedance amplifier, converting the electric-current signals of the quantity M into voltage signals of the quantity M;

detecting signal intensities of the voltage signals of the quantity M, to obtain second signal intensities of the quantity M; and according to the second signal intensities of the quantity M obtained by the detection, determining the second-signal-intensity sequence.

Optionally, the step of, according to the second-signal-intensity sequence, determining the second auxiliary signal comprises:

acquiring configuration information, wherein the configuration information contains signal-intensity sequences corresponding to different auxiliary signals, wherein the auxiliary signals include the second auxiliary signal, and the signal-intensity sequences include the second-signal-intensity sequence; and based on the configuration information, determining the second auxiliary signal corresponding to the second-signal-intensity sequence.

Optionally, the step of, according to the first-signal-intensity sequence, converting the first data signal into the first optical signals of the quantity N comprises:

by using light transceiving modules of a quantity P, according to the first-signal-intensity sequence, converting the first data signal into the first optical signals of the quantity N, wherein a sum of quantities of the PCIe optical-fiber links corresponding to the light transceiving modules of the quantity P is greater than or equal to N, a sum of quantities of the PCIe optical-fiber links of a quantity P-1 among the light transceiving modules of the quantity P is less than N, and P is a positive integer greater than or equal to 1.

Optionally, the step of, by using the light transceiving modules of the quantity P, according to the first-signal-intensity sequence, converting the first data signal into the first optical signals of the quantity N comprises:

in response to P being greater than or equal to 2, by using the light transceiving modules of a quantity Z among the light transceiving modules of the quantity P, according to the first-signal-intensity sequence and the first data signal, obtaining the first optical signals of the quantity M among the first optical signals of the quantity N, wherein a sum of quantities of the PCIe optical-fiber links corresponding to the light transceiving modules of the quantity Z is greater than or equal to M, and Z is a positive integer greater than or equal to 1 and less than or equal to Q, wherein Q is a minimum value of P and M.

Optionally, the method further comprises:

in response to a target light transceiving module that sends the first optical signals of the quantity N corresponding to the PCIe optical-fiber links of a quantity X, and a third data signal and a third auxiliary signal that are to be sent to a second opposite-side device existing, determining a third-signal-intensity sequence corresponding to the third auxiliary signal, wherein the third data signal is to be sent to the second opposite-side device via the PCIe optical-fiber links of a quantity Y, the third-signal-intensity sequence comprises third signal intensities of a quantity K, Y is a positive integer greater than or equal to 2, and X is a positive integer greater than or equal to N+Y, wherein K is a positive integer greater than or equal to 2 and less than or equal to Y; and by using the target light transceiving module, converting the third data signal into third optical signals of the quantity Y, and by using the PCIe optical-fiber links of the quantity Y, sending the third optical signals of the quantity Y to the second opposite-side device, wherein signal intensities of the third optical signals of the quantity K among the third optical signals of the quantity Y and the third signal intensities of the quantity K have a one-to-one correspondence relation therebetween.

Optionally, the method further comprises:

in response to the first data signal being transmitted via 4 PCIe optical-fiber links, and M being 4, the first-signal-intensity sequence corresponding to the first auxiliary signal is [0, 1, 0, 1], wherein 0 is for indicating that a signal intensity is greater than a predetermined signal intensity, and 1 is for indicating that a signal intensity is less than or equal to the predetermined signal intensity.

Optionally, the method further comprises:

carrying, by the first optical signals of the quantity N, the first data signal and the first auxiliary signal, obtaining, by the first opposite-side device, the first data signal according to the first optical signals of the quantity N, and according to the signal intensities of the first optical signals of the quantity M among the first optical signals of the quantity N, determining the first auxiliary signal.

Optionally, the step of, according to the data information corresponding to the first data signal carried by the i-th driving current and the amplitude of the i-th driving current, modulating the light comprises:

by using the data information carried by the i-th driving current, performing frequency modulation or phase modulation or polarization modulation to the light, and by using the amplitude of the i-th driving current, performing intensity modulation to the light.

Optionally, the step of, according to the first-signal-intensity sequence, converting the first data signal into the first optical signals of the quantity N comprises:

by using one or more light transceiving modules, according to the first-signal-intensity sequence, converting the first data signal into the first optical signals of the quantity N, comprising:

in response to a quantity of the PCIe optical-fiber links of a single instance of the light transceiving modules being less than N, by using a plurality of instances of the light transceiving modules, according to the first-signal-intensity sequence, converting the first data signal into the first optical signals of the quantity N; and in response to a quantity of the PCIe optical-fiber links of a single instance of the light transceiving modules being greater than or equal to N, by using a single instance of the light transceiving modules, according to the first-signal-intensity sequence, converting the first data signal into the first optical signals of the quantity N.

Optionally, the step of, by using the one or more light transceiving modules, according to the first-signal-intensity sequence, converting the first data signal into the first optical signals of the quantity N comprises:

in response to, at an emitting side and a receiving side of signals, 16 PCIe links being used to transmit the first data signal, directly by using 1 light transceiving module having 16 PCIe links, according to the first-signal-intensity sequence, converting the first data signal into 16 first optical signals, or, by using 2 light transceiving modules each having 8 PCIe links, according to the first-signal-intensity sequence, converting the first data signal into 16 first optical signals, or, by using 4 light transceiving modules each having 4 PCIe links, according to the first-signal-intensity sequence, converting the first data signal into 16 first optical signals.

According to another aspect of the embodiments of the present application, there is further provided a light transceiving module, wherein the light transceiving module comprises:

a laser-light driver configured for, according to a first data signal, determining driving currents of a quantity N, wherein the first data signal is to be sent to a first opposite-side device via PCIe optical-fiber links of the quantity N corresponding to the light transceiving module, and N is a positive integer greater than or equal to 2;

a controller configured for determining a first-signal-intensity sequence corresponding to a first auxiliary signal, and according to the first-signal-intensity sequence, regulating amplitudes of the driving currents of a quantity M corresponding to the first-signal-intensity sequence among the driving currents of the quantity N, whereby the amplitudes of the driving currents of the quantity M and first signal intensities of the quantity M have a one-to-one correspondence relation therebetween, wherein the first-signal-intensity sequence comprises the first signal intensities of the quantity M, M is a positive integer greater than or equal to 2 and less than or equal to N, and the first auxiliary signal is to be sent to the first opposite-side device; and a laser-generator array configured for, according to the driving currents of the quantity N, obtaining first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

Optionally, the light transceiving module further comprises:

a photodiode array configured for, in response to second optical signals of the quantity N sent by the first opposite-side device having been acquired, converting second optical signals of the quantity M that are predetermined among second optical signals of the quantity N into electric-current signals of the quantity M;

a transimpedance amplifier configured for converting the electric-current signals of the quantity M into voltage signals of the quantity M; and a detector configured for detecting signal intensities of the voltage signals of the quantity M; and according to second signal intensities of the quantity M obtained by the detection, determining a second-signal-intensity sequence, and according to the second-signal-intensity sequence, determining a second auxiliary signal, wherein the second auxiliary signal is an auxiliary signal sent by the first opposite-side device.

According to the second aspect of the embodiments of the present application, there is provided a signal sending apparatus, wherein the apparatus comprises:

an acquiring module configured for acquiring a first data signal and a first auxiliary signal that are to be sent to a first opposite-side device, wherein the first data signal is to be sent to the first opposite-side device via PCIe optical-fiber links of a quantity N, wherein N is a positive integer greater than or equal to 2;

a first determining module configured for determining a first-signal-intensity sequence corresponding to the first auxiliary signal, wherein the first-signal-intensity sequence comprises first signal intensities of a quantity M, wherein M is a positive integer greater than or equal to 2 and less than or equal to N; and a first processing module configured for, according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

According to the third aspect of the embodiments of the present application, there is further provided a non-volatile readable storage medium, wherein the non-volatile readable storage medium stores a computer program, and the computer program is configured for, when being executed, implementing the steps according to any one of the process embodiments stated above.

According to the fourth aspect of the embodiments of the present application, there is further provided an electronic device, wherein the electronic device comprises a memory and a processor, the memory stores a computer program, and the processor is configured for executing the computer program to implement the steps according to any one of the process embodiments stated above.

In the present application, the signal intensities of the optical signals of the quantity M among the optical signals of the quantity N that transmit the first data signal are changed according to the signal-intensity sequence corresponding to the auxiliary signal, and subsequently the auxiliary signal is transmitted by using the signal-intensity sequence corresponding to the signal intensities of the optical signals of the quantity M, whereby, when auxiliary information is transmitted in the PCIe optical-fiber links, it is not required to use additional photoelectric components and optical-fiber channels. In addition, by using the signal intensities of the optical signals of the quantity M to transmit the auxiliary signal, the disadvantages of the poor anti-interference performance and the increased bit error rate caused by a single channel pilot tone modulation technique are prevented, and the diversity of the combination of the signal intensities of the optical signals of the quantity M may support the transmission of more diverse auxiliary signals, which solves the problem that auxiliary information cannot be transmitted in the PCIe optical-fiber links well.

BRIEF DESCRIPTION OF THE DRAWINGS

The drawings illustrated herein are intended to provide understanding of the present application, and form part of the present application. The illustrative embodiments of the present application and their explanation are intended to interpret the present application, and do not inappropriately limit the present application. In the drawings:

FIG. 1 is a block diagram of the hardware structure of a mobile terminal for a signal sending method according to an embodiment of the present application;

FIG. 2 is a flow chart of a signal sending method according to an embodiment of the present application;

FIG. 4 is a schematic diagram of the operation principle of the transmission of an auxiliary signal via an PCIe optical-interconnection link according to an embodiment of the present application;

DETAILED DESCRIPTION

Figure 3:
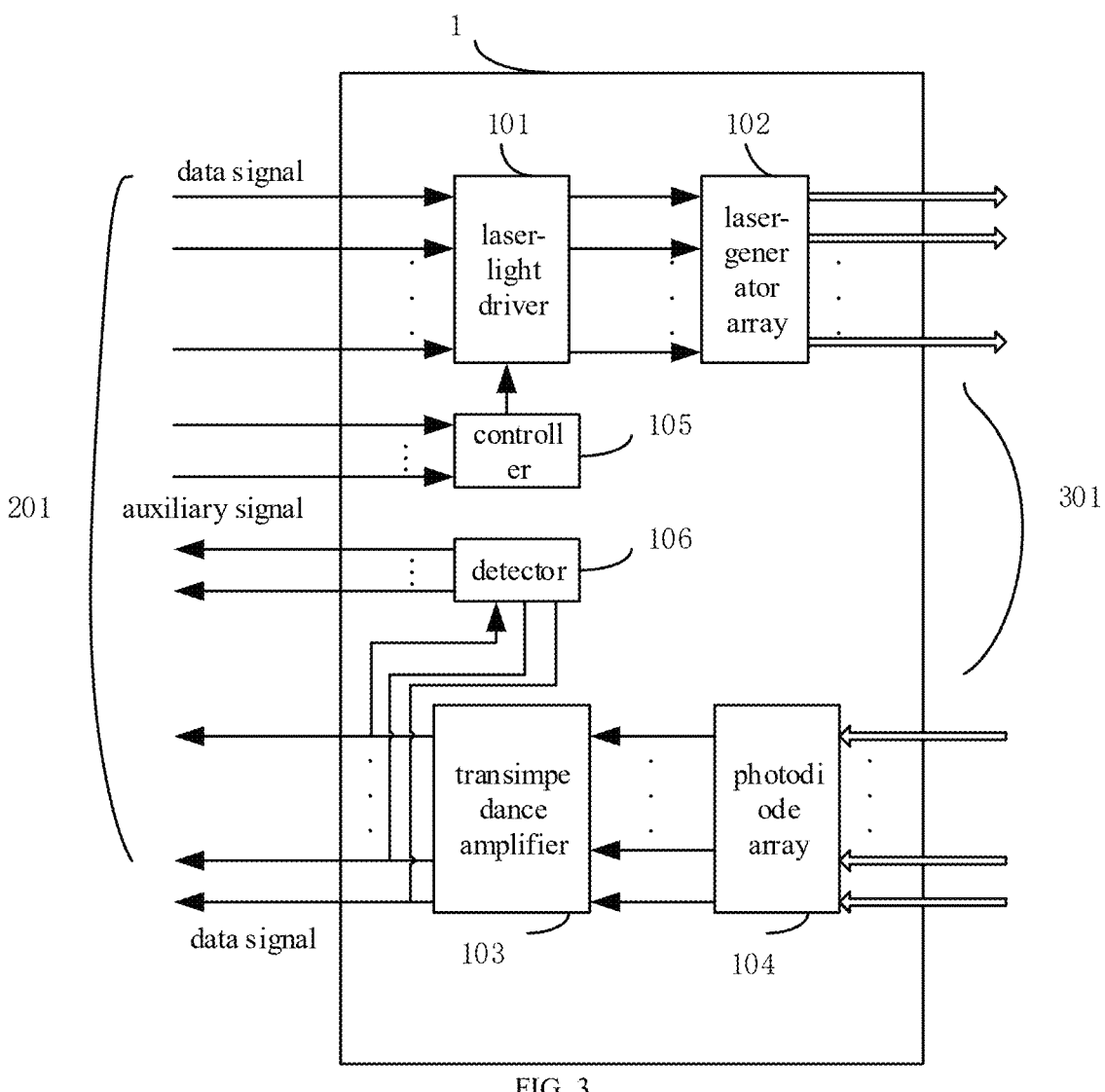
FIG. 3 is a first schematic structural diagram of a light transceiving module according to an embodiment of the present application.

In order to enable a person skilled in the art to better comprehend the solutions of the present application, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work should fall within the protection scope of the present application.

It should be noted that the terms "first", "second" and so on in the description, the claims and the drawings of the present application are intended to distinguish similar objects, and are not necessarily used to describe a particular order or sequence.

The process embodiments according to the embodiments of the present application may be implemented in a server device or a similar computing device. Taking the case as an example in which they are implemented in a server device, FIG. 1 is a block diagram of the hardware structure of a server device for a signal sending method according to an embodiment of the present application. As shown in FIG. 1, the server device may comprise one or more (FIG. 1 shows merely one) processors 1102 (the processors 1102 may include but are not limited to a processing device such as a microprocessor MCU or a programmable logic device FPGA) and a memory 1104 configured for storing data. The server device may further comprise a transmitting device 1106 for the communicate function and an inputting-outputting device 1108. A person skilled in the art can understand that the structure shown in FIG. 1 is merely illustrative, and does not limit the structure of the server device. For example, the server device may also comprise more or fewer components than those shown in FIG. 1, or have a different configuration from that shown in FIG. 1.

The memory 1104 is configured for storing a computer program, for example, the software programs and modules of an application software, for example, a computer program corresponding to the signal sending method according to the embodiments of the present application. The processors 1102 execute the computer program stored in the memory 1104, so as to execute various function applications and data processing, i.e., implementing the method stated above. The memory 1104 may include a high-speed random access memory, and may also include a non-volatile memory, for example, one or more magnetic storing devices, flash memories, or other non-volatile solid-state memories. In some embodiments, the memory 1104 includes memories provided remotely to the processors 1102, and those remote memories may be connected to the server device via a network. Examples of the network include but are not limited to the Internet, an enterprise intranet, a local area network, a mobile communication net and a combination thereof.

The transmitting device 1106 is configured for receiving or emitting data via a network. Examples of the network may include a wireless network supplied by the communication supplier of the server device. In an embodiment, the transmitting device 1106 comprises a network adaptor (Network Interface Controller, referred to for short as NIC), which may be connected to other network devices via a base station so as to communicate with the Internet. In an embodiment, the transmitting device 1106 may be a Radio Frequency (referred to for short as RF) module, which is configured for communicating with the Internet wirelessly.

In order to solve the above problem, the present embodiment provides a signal sending method. FIG. 2 is a flow chart of a signal sending method according to an embodiment of the present application. As shown in FIG. 2, the flow comprises the following steps S202-S206:

Step S202: acquiring a first data signal and a first auxiliary signal that are to be sent to a first opposite-side device, wherein the first data signal is to be sent to the first opposite-side device via PCIe optical-fiber links of a quantity N.

It should be noted that the first data signal is an electric signal carrying data information, the transmission speed of the first data signal in a PCIe link is greater than a preset threshold, the first auxiliary signal is an auxiliary signal that is to be sent to the first opposite-side device, the auxiliary signal is used to realize the construction of the PCIe optical-fiber links and the changing of the link state, and N is a positive integer greater than or equal to 2.

It should be noted that a signal whose transmission speed is greater than a preset threshold is defined as a high-speed signal, a signal whose transmission speed is less than or equal to the preset threshold is defined as a low-speed signal, and the first data signal is a high-speed data signal. PCIe is a high-speed serial computer expansion-bus standard, and is mainly used to expand the data throughput of a computer system bus and increase the equipment communication speed. When an optical fiber is used as the transmission medium, as compared with the traditional electric-wire connection, it has a higher transmission speed, a longer transmission distance and a lower loss. The PCIe optical-fiber link may be used to connect the components of a computer system, such as the graphics card, the storage device and the network adapter, to realize high-speed data transmission and communication. However, the signal transmission of the optical-fiber link is not established by the PCIe protocol. In a general optical-fiber link the transmitted data signal is a high-speed data signal, and, besides the high-speed data signal, a PCIe link is further required to transmit a low-speed auxiliary signal, for constructing the PCIe link and performing state changing. The above-described auxiliary signal is the low-speed auxiliary signal that is to be transmitted in the PCIe link.

Step S204: determining a first-signal-intensity sequence corresponding to the first auxiliary signal, wherein the first-signal-intensity sequence comprises first signal intensities of a quantity M, wherein M is a positive integer greater than or equal to 2 and less than or equal to N.

It should be noted that the first auxiliary signal and the first-signal-intensity sequence have a one-to-one correspondence relation therebetween.

As an alternative example, assuming that the first data signal is transmitted via 4 PCIe optical-fiber links, and assuming that M is 4, then the first-signal-intensity sequence corresponding to the first auxiliary signal may be [0, 1, 0, 1], wherein 0 is for indicating that a signal intensity is greater than a predetermined signal intensity, and 1 is for indicating that a signal intensity is less than or equal to the predetermined signal intensity.

Step S206: according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

It should be noted that the first optical signals of the quantity N carry the first data signal and the first auxiliary signal, and the first opposite-side device may obtain the first data signal according to the first optical signals of the quantity N, and may also, according to the signal intensities of the first optical signals of the quantity M among the first optical signals of the quantity N, determine the first auxiliary signal.

It should be noted that, if it is not required to transmit the first auxiliary signal, the first data signal is required to be converted into optical signals of the quantity N to be transmitted. If it is required to transmit the first auxiliary signal, it is required to, according to the first-signal-intensity sequence, change the signal intensities of the corresponding optical signals of the quantity M among the optical signals of the quantity N, so that the signal intensities of the obtained first optical signals of the quantity M and the first signal intensities of the quantity M have a one-to-one correspondence relation therebetween, whereby the first opposite-side device determines the first auxiliary signal according to the signal intensities of the first optical signals of the quantity M.

It should be noted that the subject of the implementation of the steps S202-S206 includes but is not limited to a light transceiving module. The light transceiving module is a photoelectricity converting device used for optical-fiber communication systems, and the light transceiving module comprises a light emitting part and a light receiving part.

By using the steps S202-S206, the signal intensities of the optical signals of the quantity M among the optical signals of the quantity N that transmit the first data signal are changed according to the signal-intensity sequence corresponding to the auxiliary signal, and subsequently the auxiliary signal is transmitted by using the signal-intensity sequence corresponding to the signal intensities of the optical signals of the quantity M, whereby, when auxiliary information is transmitted in the PCIe optical-fiber links, it is not required to use additional photoelectric components and optical-fiber channels. In addition, by using the signal intensities of the optical signals of the quantity M to transmit the auxiliary signal, the disadvantages of the poor anti-interference performance and the increased bit error rate caused by a single channel pilot tone modulation technique are prevented, and the diversity of the combination of the signal intensities of the optical signals of the quantity M may support the transmission of more diverse auxiliary signals, which solves the problem that auxiliary information cannot be transmitted in the PCIe optical-fiber links well.

In an illustrative embodiment, the step of determining the first-signal-intensity sequence corresponding to the first auxiliary signal may be executed by using the following steps S11-S12:

Step S11: acquiring configuration information, wherein the configuration information contains signal-intensity sequences corresponding to different auxiliary signals, wherein the auxiliary signals include the first auxiliary signal, and the signal-intensity sequences include the first-signal-intensity sequence; and Step S12: based on the configuration information, determining the first-signal-intensity sequence corresponding to the first auxiliary signal.

As an alternative example, the configuration information is configuration information that is determined by negotiation between the emitting side and the receiving side of the signals.

As an alternative example, the configuration information may be obtained by configuring by a target object (i.e., the operation and maintenance staff), and subsequently the target object configures the configuration information at the emitting side and the receiving side of the signals. Subsequently, the emitting side may, according to the configuration information, determine the first-signal-intensity sequence corresponding to the first auxiliary signal, and the receiving side may, according to the first-signal-intensity sequence, determine the corresponding first auxiliary signal.

In an illustrative embodiment, the step of, according to the first-signal-intensity sequence, converting the first data signal into the first optical signals of the quantity N may be executed by using the following steps S21-S23:

Step S21: by using a laser-light driver, according to the first data signal, determining driving currents of the quantity N.

It should be noted that the driving currents of the quantity N are used to control the laser-generator array to generate the optical signals of the quantity N corresponding to the first data signal.

Step S22: according to the first-signal-intensity sequence, regulating amplitudes of the driving currents of the quantity M corresponding to the first-signal-intensity sequence among the driving currents of the quantity N, whereby the amplitudes of the driving currents of the quantity M and the first signal intensities of the quantity M have a one-to-one correspondence relation therebetween.

Step S23: by using a laser-generator array, according to the driving currents of the quantity N, obtaining the first optical signals of the quantity N.

In order to facilitate the comprehension, as an alternative example, FIG. 3 schematically shows a schematic structural diagram of a light transceiving module. As shown in FIG. 3, the laser-light driver 101 in the light transceiving module 1 in FIG. 3 is configured for receiving the first data signal, and determining the driving currents of the quantity N corresponding to the first data signal. The controller 105 may, according to the first-signal-intensity sequence corresponding to the first auxiliary signal, control the amplitudes of the driving currents of the quantity M corresponding to the first-signal-intensity sequence among the driving currents of the quantity N outputted by the laser-light driver 101. Subsequently, the laser-generator array, after has received the driving currents of the quantity N sent by the laser-light driver, according to the driving currents of the quantity N, obtains the first optical signals of the quantity N.

It should be noted that the amplitudes of the electric currents outputted by the laser-light driver 101 are regulated by the controller 105 to be within the normal working range of the laser-generator array 102, and they will not be excessively high to cause saturation of the photodiodes in the photodiode (Photovoltaic Diode, referred to for short as PD) arrays 104 of the laser generator and the receiving side, and will not be excessively low to cause the photodiodes in the photodiode arrays 104 of the laser generator and the receiving side to be incapable of normally operating.

It should be noted that the driving currents are electric currents that control and drive the electronic devices, and the magnitudes of the driving currents depend on the requirements and the working conditions of the driven devices. As shown in FIG. 3, the driving currents control each of the channels of the laser generators in the laser-generator array 102 of the light transceiving module 1 to output the optical signals. The optical signal refers to the information that is transmitted by light transmission. In an optical signal, the information is converted by using an optical-transmission medium (for example, an optical fiber) into light pulses to be transmitted. The optical signal may be a digital signal or an analog signal. The optical signal has the advantages of high-speed transmission, a high bandwidth, a low transmission loss, and resistance to electromagnetic interference.

In an illustrative embodiment, the step of, according to the driving currents of the quantity N, obtaining the first optical signals of the quantity N may be executed by using the following step S31:

Step S31: obtaining an i-th optical signal among the first optical signals of the quantity N in the following manner, to obtain the first optical signals of the quantity N:

according to data information corresponding to the first data signal carried by an i-th instance of the driving currents and an amplitude of the i-th driving current, modulating a light, to obtain the i-th optical signal.

It should be noted that the optical modulation refers to changing some properties of a light wave, for example, the intensity, the frequency, the phase or the polarization state of the light, to transmit information or realize a particular function. The optical modulation includes intensity modulation, frequency modulation, phase modulation and polarization modulation.

As an alternative example, this step may comprise, by using the data information carried by the i-th driving current, performing frequency modulation or phase modulation or polarization modulation to the light, and may comprise, by using the amplitude of the i-th driving current, performing intensity modulation to the light.

In an illustrative embodiment, the method further comprises the following steps S41-S42:

Step S41: in response to second optical signals of the quantity N sent by the first opposite-side device having been acquired, according to the second optical signals of the quantity M that are predetermined among the second optical signals of the quantity N, determining a second-signal-intensity sequence corresponding to the second optical signals of the quantity M.

It should be noted that the second optical signals of the quantity N carry a second data signal sent by the first opposite-side device.

It should be noted that the emitting side and the receiving side of the optical signals are required to predetermine which optical signals are used to transmit the auxiliary information. For example, it is assumed that the emitting side and the receiving side transmit the second data signal by using 4 PCIe optical-fiber links; in other words, the receiving side receives 4 optical signals sent by the emitting side.

What is predetermined is that a first optical signal, a second optical signal and a fourth optical signal are used to carry the auxiliary information. Subsequently, the receiving side obtains the signal-intensity sequence according to the first optical signal, the second optical signal and the fourth optical signal among the 4 received optical signals, and subsequently obtains the auxiliary information according to the signal-intensity sequence.

Step S42: according to the second-signal-intensity sequence, determining a second auxiliary signal, wherein the second auxiliary signal is an auxiliary signal sent by the first opposite-side device.

It should be noted that the second-signal-intensity sequence and the second auxiliary signal have a one-to-one correspondence relation therebetween.

In an illustrative embodiment, the step of, according to the second optical signals of the quantity M that are predetermined among the second optical signals of the quantity N, determining the second-signal-intensity sequence corresponding to the second optical signals of the quantity M may be executed by using the following steps S51-S53:

Step S51: by using a photodiode array, converting the second optical signals of the quantity M into electric-current signals of the quantity M, and by using a transimpedance amplifier, converting the electric-current signals of the quantity M into voltage signals of the quantity M.

It should be noted that the photodiode array is a two-dimensional array formed by a plurality of photodiodes. A photodiode is a device that can convert an optical signal into an electric signal, and is generally formed by a positive-negative junction (P-N Junction, referred to for short as a PN junction). When a light is irradiating a photodiode, the energy of the photons excites the charge carriers in the PN junction, thereby forming an electric current. The photodiode array, by using the plurality of photodiodes arranged in a two-dimensional plane, can detect a plurality of optical signals simultaneously, and convert them into electric signals. The transimpedance amplifier is an electric circuit configured for converting a signal from one resistance value into another resistance value. It is generally formed by a differential amplifier and a conversion resistor. The differential amplifier is configured for amplifying the inputted signal, and converting the inputted signal into a differential outputted signal. The conversion resistor is configured for converting the differential outputted signal into a single-terminal outputted signal, and changing the resistance value. It is mainly configured for converting a voltage signal into an electric-current signal or converting an electric-current signal into a voltage signal.

Step S52: detecting signal intensities of the voltage signals of the quantity M, to obtain second signal intensities of the quantity M.

Step S53: according to the second signal intensities of the quantity M obtained by the detection, determining the second-signal-intensity sequence.

As an alternative example, as shown in FIG. 3, the photodiode array converts the second optical signals of the quantity N into electric-current signals of the quantity N, and sends them to the transimpedance amplifier, and subsequently the transimpedance amplifier converts the electric-current signals of the quantity N into voltage signals of the quantity N. It should be noted that those voltage signals of the quantity N are exactly the second data signal sent by the first opposite-side device. The detector 106 detects the amplitudes of the voltage signals of the quantity M among the voltage signals of the quantity N outputted by the transimpedance amplifier 103, to obtain the second signal intensities of the quantity M, to determine the second-signal-intensity sequence.

It should be noted that the PCIe signals outputted by the transimpedance amplifier 103 (i.e., the above-described voltage signals) satisfy the specification of the PCIe protocol, and can be normally identified by the receiving-side device.

It should be noted that the controller 105 and the detector 106 may be the same one device, whose function is controlling the amplitudes of the signals outputted by the laser-light driver 101 and detecting the amplitudes of the signals outputted independently by the transimpedance amplifier 104.

In an illustrative embodiment, the step of, according to the second-signal-intensity sequence, determining the second auxiliary signal may be executed by using the following steps S61-S62:

Step S61: acquiring configuration information, wherein the configuration information contains signal-intensity sequences corresponding to different auxiliary signals, wherein the auxiliary signals include the second auxiliary signal, and the signal-intensity sequences include the second-signal-intensity sequence; and Step S62: based on the configuration information, determining the second auxiliary signal corresponding to the second-signal-intensity sequence.

It should be noted that, because the configuration information contains the signal-intensity sequences corresponding to the different auxiliary signals, the second auxiliary signal corresponding to the second-signal-intensity sequence may be searched for from the configuration information.

In an illustrative embodiment, the step of, according to the first-signal-intensity sequence, converting the first data signal into the first optical signals of the quantity N comprises the step S71:

Step S71: by using light transceiving modules of a quantity P, according to the first-signal-intensity sequence, converting the first data signal into the first optical signals of the quantity N, wherein a sum of quantities of the PCIe optical-fiber links corresponding to the light transceiving modules of the quantity P is greater than or equal to N, a sum of quantities of the PCIe optical-fiber links of a quantity P-1 among the light transceiving modules of the quantity P is less than N, and P is a positive integer greater than or equal to 1.

It should be noted that one or more light transceiving modules may be used to transmit the first data signal. Because each of the light transceiving modules comprises a plurality of PCIe optical-fiber links, if the PCIe optical-fiber links of a single light transceiving module do not satisfy the demand on the transmission of the first data signal, a plurality of light transceiving modules may be used to jointly transmit the first data signal.

In an illustrative embodiment, if the emitting side and the receiving side of the signals require using 16 PCIe links to transmit the first data signal, in this case 1 light transceiving module having 16 PCIe links may be directly used to transmit the first data signal, 2 light transceiving modules each having 8 PCIe links may also be used to jointly transmit the first data signal, and 4 light transceiving modules each having 4 PCIe links may also be used to jointly transmit the first data signal.

In an illustrative embodiment, the step of, by using the light transceiving modules of the quantity P, according to the first-signal-intensity sequence, converting the first data signal into the first optical signals of the quantity N may be executed by using the following step S81:

Step S81: in response to P being greater than or equal to 2, by using the light transceiving modules of a quantity Z among the light transceiving modules of the quantity P, according to the first-signal-intensity sequence and the first data signal, obtaining the first optical signals of the quantity M among the first optical signals of the quantity N, wherein a sum of quantities of the PCIe optical-fiber links corresponding to the light transceiving modules of the quantity Z is greater than or equal to M, and Z is a positive integer greater than or equal to 1 and less than or equal to Q, wherein Q is a minimum value of P and M.

In other words, one light transceiving module among the light transceiving modules of the quantity P may be used to transmit the auxiliary signal, and a plurality of light transceiving modules among the light transceiving modules of the quantity P may be used to jointly transmit the auxiliary signal.

In an illustrative embodiment, the method further comprises the following steps S91-S92:

Step S91: in response to a target light transceiving module that sends the first optical signals of the quantity N corresponding to the PCIe optical-fiber links of a quantity X, and a third data signal and a third auxiliary signal that are to be sent to a second opposite-side device existing, determining a third-signal-intensity sequence corresponding to the third auxiliary signal, wherein the third data signal is to be sent to the second opposite-side device via the PCIe optical-fiber links of a quantity Y, the third-signal-intensity sequence comprises third signal intensities of a quantity K, Y is a positive integer greater than or equal to 2, and X is a positive integer greater than or equal to N+Y, wherein K is a positive integer greater than or equal to 2 and less than or equal to Y.

It should be noted that the third data signal is an electric signal carrying data information, the transmission speed of the third data signal in a PCIe link is greater than a preset threshold, and the third auxiliary signal is an auxiliary signal that is to be sent to the second opposite-side device.

Step S92: by using the target light transceiving module, converting the third data signal into third optical signals of the quantity Y, and by using the PCIe optical-fiber links of the quantity Y, sending the third optical signals of the quantity Y to the second opposite-side device, wherein signal intensities of the third optical signals of the quantity K among the third optical signals of the quantity Y and the third signal intensities of the quantity K have a one-to-one correspondence relation therebetween.

In other words, if the quantity of the PCIe optical-fiber links of one light transceiving module is sufficient for the transmission of a plurality of PCIe signals, one light transceiving module may be connected to a plurality of PCIe devices at the same time, to transmit a plurality of PCIe data signals.

Apparently, the above-described embodiments are merely certain embodiments of the present application, rather than all of the embodiments. In order to facilitate to comprehend the above-described method, the above-described process will be described below with reference to the embodiments, which are not a limitation on the technical solutions of the embodiments of the present application. Optionally:

The present application provides a method of transmission of an auxiliary signal via a PCIe optical-interconnection link, which comprises converting low-speed PCIe-protocol auxiliary signals (including the first auxiliary signal, the second auxiliary signal and the third auxiliary signal described above) into a particular sequence combination of the amplitudes of multi-port-channel high-speed data signals, detecting the amplitudes of the multi-channel high-speed data signals by the receiving side, extracting a particular combination of the amplitudes (i.e., the signal-intensity sequence described above), and outputting the corresponding low-speed auxiliary signal, which may realize the transmission of the auxiliary signals in the PCIe links constructed via optical fibers between the mainframe such as a server and an external device, and realize the construction of the PCIe optical-fiber links and the changing of the link state.

FIG. 3 schematically shows a light transceiving module. As shown in FIGS. 3, 1 denotes the light transceiving module, 101 denotes a laser-light driver, 102 denotes a laser-generator array, 103 denotes a transimpedance amplifier, 104 denotes a photodiode array, 105 denotes a controller, and 106 denotes a detector. 201 denotes an electric passage connected to the light transceiving module, and 301 denotes an optical fiber connected to the light transceiving module.

When the emitting side connected to the device is sending the signals, the light transceiving module 1 receives the data signal and the auxiliary signal of the upstream device via the electric passage 201, wherein the data signal is directly transmitted into the laser-light driver 101, and the auxiliary signal is transmitted into the controller 105. The controller 105 identifies out the auxiliary signal, subsequently, according to a predetermined combination sequence, controls the amplitudes of the driving currents outputted by the laser-light driver 101, and subsequently controls the amplitudes of the optical signals outputted by each of the channels of the laser generators in the laser-generator array 102, to form a predetermined optical-signal combination sequence containing auxiliary-signal information, which is finally sent to the light transceiving module 1 at the opposite side via the optical fiber 301.

When the device is receiving the signals via the optical fiber 301, the received optical signals are converted by the photodiode array 104, subsequently electric-current signals are outputted to the transimpedance amplifier 103, the electric-current signals pass through the transimpedance amplifier 103, and voltage signals are outputted. Those voltage signals are the data signal transmitted by the opposite-side device, and subsequently are transmitted via the electric passage 201 to the receiving device. Simultaneously, the detector 106 detects the voltage amplitudes of the data signals outputted by the transimpedance amplifier 103, to obtain a combination sequence of the voltage amplitudes of the data signals, and parses according to a predetermined rule to obtain the auxiliary signal transmitted by the opposite-side device.

In the above-described process, the controller 105 may adjust the combination sequence represented by the auxiliary signal according to the quantity of the laser generators comprised by the laser-generator array 102, to adapt the light transceiving modules 1 of different channel quantities. Moreover, the amplitudes of the electric currents outputted by the laser-light driver 101 are regulated by the controller 105 to be within the normal working range of the laser-generator array 102, and they will not be excessively high to cause saturation of the photodiodes in the photodiode arrays 104 of the laser generator and the receiving side, and will not be excessively low to cause the photodiodes in the photodiode arrays 104 of the laser generator and the receiving side to be incapable of normally operating. Optionally, the PCIe signals outputted by the transimpedance amplifier 103 satisfy the specification of the PCIe protocol, and can be normally identified by the receiving-side device.

Optionally, a plurality of light transceiving modules 1 may be connected to 1 PCIe device, to jointly transmit 1 PCIe data signal. In this case, optionally, merely one light transceiving module 1 is used to transmit the auxiliary signal, and a plurality of light transceiving modules 1 may also jointly transmit the PCIe auxiliary signal. Optionally, one light transceiving module 1 may also be simultaneously connected to a plurality of PCIe devices, to transmit a plurality of PCIe data signals, in which case the light transceiving module 1, if the quantity of the channels is sufficient, can transmit a plurality of PCIe auxiliary signals.

In addition, the controller 105 and the detector 106 may be the same one device, whose function is controlling the amplitudes of the signals outputted by the laser-light driver 101 and detecting the amplitudes of the signals outputted independently by the transimpedance amplifier 104 On the basis of the above-described process, FIG. 4 is a schematic diagram of the operation principle of the transmission of the auxiliary signal via the PCIe optical-interconnection link according to an embodiment of the present application. As shown in FIG. 4, the process comprises the following steps:

Step 1: receiving, by the laser-light driver, a PCIe high-speed data signal transmitted by the upstream emitting side, and receiving, by the controller, a PCIe low-speed auxiliary signal emitted by the upstream emitting side;

Step 2: according to the combination sequence predetermined for the low-speed PCIe auxiliary signal, regulating the laser-light driver to control the intensities of the optical signals outputted by each of the channels of the laser generators in the laser-generator array, i.e., regulating the intensities of the optical signals obtained by the photovoltaic conversion of the high-speed data signal, to realize a particular light-intensity combination sequence, and subsequently transmitting via the optical fiber;

Step 3: receiving, by the photodiode array, the optical signals of unequal amplitudes of the emitting side, subsequently generating photocurrents of unequal amplitudes, subsequently outputting, by the transimpedance amplifier, PCIe high-speed data signals of unequal voltage amplitudes, and subsequently transmitting the PCIe high-speed data signals to the receiving side; and Step 4: by the detector, sampling the amplitudes of each of the channels of the PCIe high-speed data signals, to obtain a combination sequence of the voltage amplitudes of the data signals, determining and parsing according to a predetermined rule to obtain the low-speed PCIe auxiliary signals, and transmitting to the receiving side.

Figure 5:
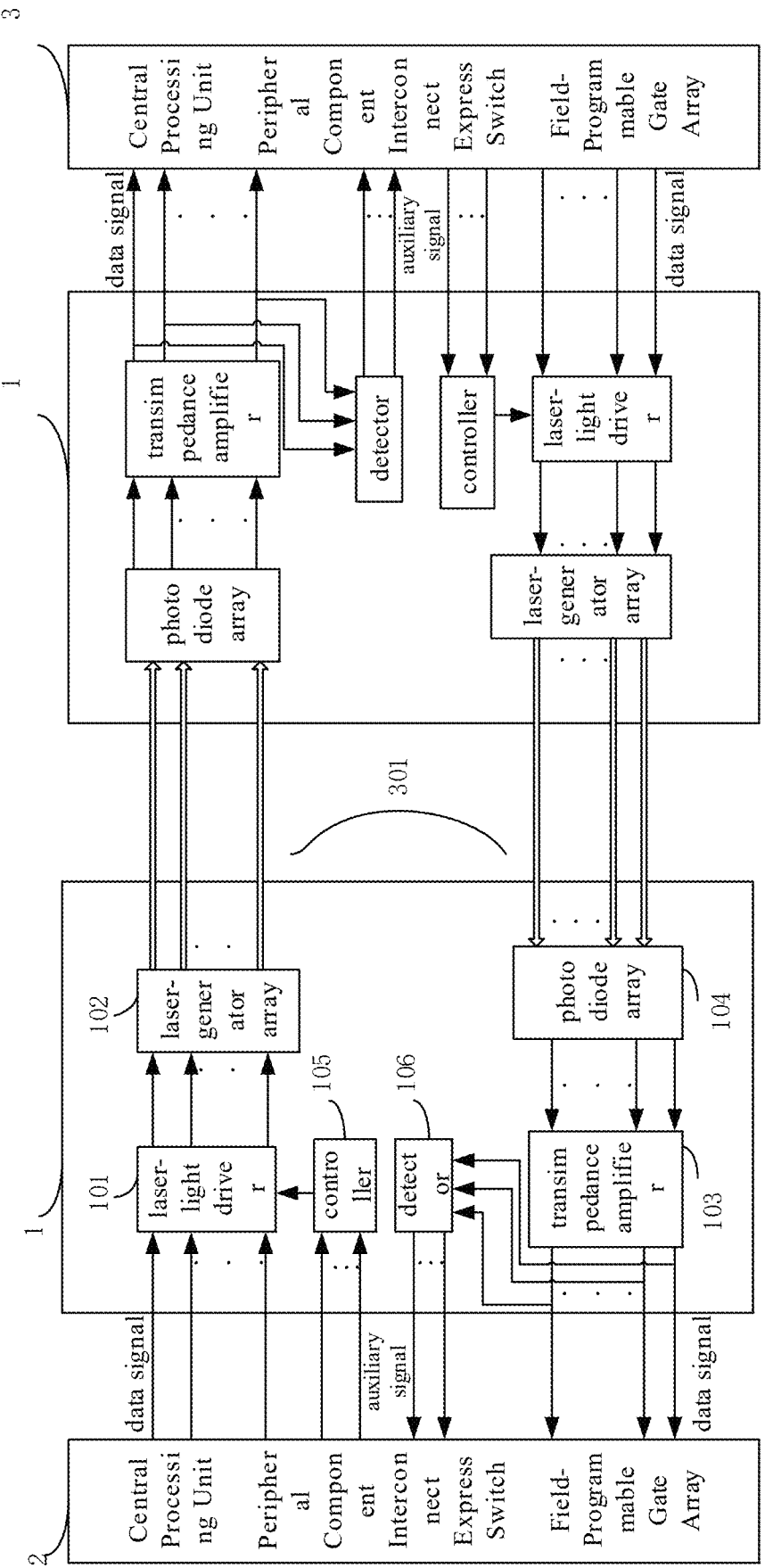
FIG. 5 is a schematic diagram of a solution of a system of transmission of an auxiliary signal via a PCIe optical-interconnection link according to an embodiment of the present application.

Besides the above-described solution, the present application further provides a system of transmission of an auxiliary signal via a PCIe optical-interconnection link. FIG. 5 is a schematic diagram of a solution of a system of transmission of an auxiliary signal via a PCIe optical-interconnection link according to an embodiment of the present application. The chip in the Host side 2 of the upstream device directly connected to the light transceiving module 1 may be a Central Processing Unit (referred to for short as CPU), a Peripheral Component Interconnect Express Switch (referred to for short as PCIe Switch), a PCIe controller, a FPGA and so on. 3 denotes the terminal device, and the chip or device directly connected to the light transceiving module 1 may be a GPU, a PCIe Switch, a PCIe clock-signal restructurer, a FPGA and so on.

In the present application, by converting low-speed PCIe-protocol auxiliary signals into a particular sequence combination of the amplitudes of multi-port-channel high-speed data signals, detecting the amplitudes of the multi-channel high-speed data signals by the receiving side, extracting a particular combination of the amplitudes, and outputting the corresponding low-speed auxiliary signal, the transmission of the PCIe-protocol auxiliary signals in the optical-fiber links is realized. Optionally, by transmitting the auxiliary signals by using the combination of the channels of the multi-channel high-speed data signals, usage of additional photoelectric components and optical-fiber channels is avoided. Moreover, by using the combination of the multi-channel high-speed signals to transmit the auxiliary signal, the disadvantages of the poor anti-interference performance and the increased bit error rate caused by a single channel pilot tone modulation technique are prevented, and, with the same quantity of the data channels, by using the diversity of the combinations, more auxiliary signals may be supported. In addition, the technical solutions in the present application may be used for the construction of the optical interconnect link based on the PCIe 5.0 protocol.

From the description on the above embodiments, a person skilled in the art can clearly know that the method according to the above embodiments may be implemented by means of software plus a necessary generic hardware platform, and, certainly, may also be implemented by hardware, but in many circumstances the former is the preferable embodiment. On the basis of such a comprehension, the substance of the technical solutions of the present application, or the part thereof that makes a contribution over the prior art, may be embodied in the form of a software product. The computer software product is stored in a non-volatile readable storage medium (such as an ROM/RAM, a diskette and an optical disk), and contains multiple instructions configured so that a terminal device (which may be a mobile phone, a computer, a server, a network device and so on) implements the methods according to the embodiments of the present application.

The present embodiment further provides a signal sending apparatus, wherein the apparatus is configured for implementing the above embodiments and alternative embodiments, wherein what have been described are not discussed further. As used below, the term "module" may implement the combination of software and/or hardware of predetermined functions. Although the apparatus described in the following embodiments is implemented preferably with software, implementation of hardware, or a combination of software and hardware, is also feasible and envisaged.

Figures 6, 7:
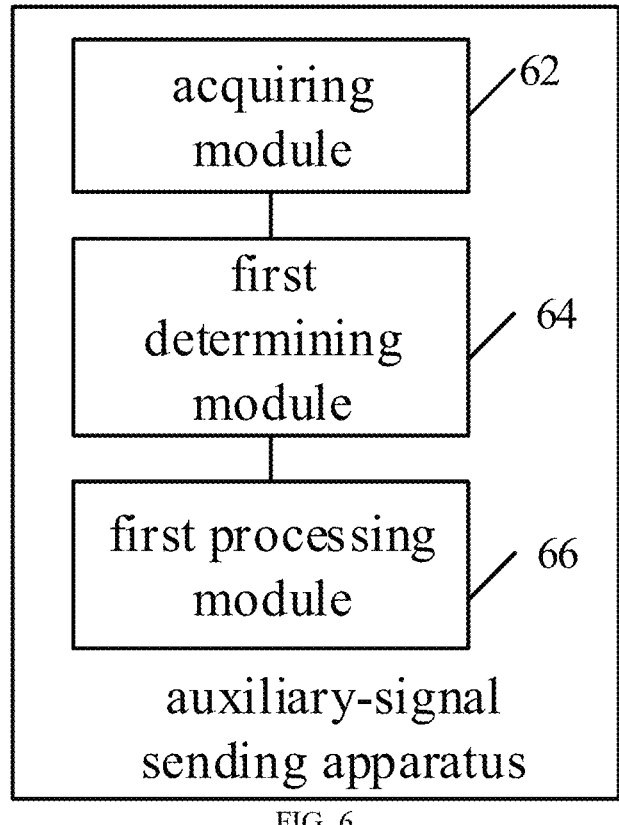
FIG. 6 is a structural block diagram of a signal sending apparatus according to an embodiment of the present application.
FIG. 7 is a second schematic structural diagram of a light transceiving module according to an embodiment of the present application.

FIG. 6 is a structural block diagram of a signal sending apparatus according to an embodiment of the present application. As shown in FIG. 6, the apparatus comprises:

an acquiring module 62 configured for acquiring a first data signal and a first auxiliary signal that are to be sent to a first opposite-side device, wherein the first data signal is to be sent to the first opposite-side device via PCIe optical-fiber links of a quantity N, wherein N is a positive integer greater than or equal to 2;

a first determining module 64 configured for determining a first-signal-intensity sequence corresponding to the first auxiliary signal, wherein the first-signal-intensity sequence comprises first signal intensities of a quantity M, wherein M is a positive integer greater than or equal to 2 and less than or equal to N; and a first processing module 66 configured for, according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

By using the apparatus, the signal intensities of the optical signals of the quantity M among the optical signals of the quantity N that transmit the first data signal are changed according to the signal-intensity sequence corresponding to the auxiliary signal, and subsequently the auxiliary signal is transmitted by using the signal-intensity sequence corresponding to the signal intensities of the optical signals of the quantity M, whereby, when auxiliary information is transmitted in the PCIe optical-fiber links, it is not required to use additional photoelectric components and optical-fiber channels. In addition, by using the signal intensities of the optical signals of the quantity M to transmit the auxiliary signal, the disadvantages of the poor anti-interference performance and the increased bit error rate caused by a single channel pilot tone modulation technique are prevented, and the diversity of the combination of the signal intensities of the optical signals of the quantity M may support the transmission of more diverse auxiliary signals, which solves the problem that auxiliary information cannot be transmitted in the PCIe optical-fiber links well.

In an illustrative embodiment, the first determining module 64 is further configured for:

acquiring configuration information, wherein the configuration information contains signal-intensity sequences corresponding to different auxiliary signals, wherein the auxiliary signals include the first auxiliary signal, and the signal-intensity sequences include the first-signal-intensity sequence; and based on the configuration information, determining the first-signal-intensity sequence corresponding to the first auxiliary signal.

In an illustrative embodiment, the first processing module 66 is further configured for:

by using a laser-light driver, according to the first data signal, determining driving currents of the quantity N;

according to the first-signal-intensity sequence, regulating amplitudes of the driving currents of the quantity M corresponding to the first-signal-intensity sequence among the driving currents of the quantity N, whereby the amplitudes of the driving currents of the quantity M and the first signal intensities of the quantity M have a one-to-one correspondence relation therebetween; and by using a laser-generator array, according to the driving currents of the quantity N, obtaining the first optical signals of the quantity N.

In an illustrative embodiment, the first processing module 66 is further configured for:

obtaining an i-th optical signal among the first optical signals of the quantity N in the following manner, to obtain the first optical signals of the quantity N:

according to data information corresponding to the first data signal carried by an i-th instance of the driving currents and an amplitude of the i-th driving current, modulating a light, to obtain the i-th optical signal.

In an illustrative embodiment, the apparatus further comprises: a second determining module configured for:

in response to second optical signals of the quantity N sent by the first opposite-side device having been acquired, according to the second optical signals of the quantity M that are predetermined among the second optical signals of the quantity N, determining a second-signal-intensity sequence corresponding to the second optical signals of the quantity M; and according to the second-signal-intensity sequence, determining a second auxiliary signal, wherein the second auxiliary signal is an auxiliary signal sent by the first opposite-side device.

In an illustrative embodiment, the second determining module is further configured for:

by using a photodiode array, converting the second optical signals of the quantity M into electric-current signals of the quantity M, and by using a transimpedance amplifier, converting the electric-current signals of the quantity M into voltage signals of the quantity M;

detecting signal intensities of the voltage signals of the quantity M, to obtain second signal intensities of the quantity M; and according to the second signal intensities of the quantity M obtained by the detection, determining the second-signal-intensity sequence.

In an illustrative embodiment, the second determining module is further configured for:

acquiring configuration information, wherein the configuration information contains signal-intensity sequences corresponding to different auxiliary signals, wherein the auxiliary signals include the second auxiliary signal, and the signal-intensity sequences include the second-signal-intensity sequence; and based on the configuration information, determining the second auxiliary signal corresponding to the second-signal-intensity sequence.

In an illustrative embodiment, the first processing module 66 is further configured for:

by using light transceiving modules of a quantity P, according to the first-signal-intensity sequence, converting the first data signal into the first optical signals of the quantity N, wherein a sum of quantities of the PCIe optical-fiber links corresponding to the light transceiving modules of the quantity P is greater than or equal to N, a sum of quantities of the PCIe optical-fiber links of a quantity P-1 among the light transceiving modules of the quantity P is less than N, and P is a positive integer greater than or equal to 1.

In an illustrative embodiment, the first processing module 66 is further configured for:

in response to P being greater than or equal to 2, by using the light transceiving modules of a quantity Z among the light transceiving modules of the quantity P, according to the first-signal-intensity sequence and the first data signal, obtaining the first optical signals of the quantity M among the first optical signals of the quantity N, wherein a sum of quantities of the PCIe optical-fiber links corresponding to the light transceiving modules of the quantity Z is greater than or equal to M, and Z is a positive integer greater than or equal to 1 and less than or equal to Q, wherein Q is a minimum value of P and M.

In an illustrative embodiment, the apparatus further comprises: a second processing module configured for:

in response to a target light transceiving module that sends the first optical signals of the quantity N corresponding to the PCIe optical-fiber links of a quantity X, and a third data signal and a third auxiliary signal that are to be sent to a second opposite-side device existing, determining a third-signal-intensity sequence corresponding to the third auxiliary signal, wherein the third data signal is to be sent to the second opposite-side device via the PCIe optical-fiber links of a quantity Y, the third-signal-intensity sequence comprises third signal intensities of a quantity K, Y is a positive integer greater than or equal to 2, and X is a positive integer greater than or equal to N+Y, wherein K is a positive integer greater than or equal to 2 and less than or equal to Y; and by using the target light transceiving module, converting the third data signal into third optical signals of the quantity Y, and by using the PCIe optical-fiber links of the quantity Y, sending the third optical signals of the quantity Y to the second opposite-side device, wherein signal intensities of the third optical signals of the quantity K among the third optical signals of the quantity Y and the third signal intensities of the quantity K have a one-to-one correspondence relation therebetween.

It should be noted that the present embodiment further provides a light transceiving module. FIG. 7 is a second schematic structural diagram of a light transceiving module according to an embodiment of the present application. The light transceiving module comprises:

a laser-light driver 101 configured for, according to a first data signal, determining driving currents of a quantity N, wherein the first data signal is to be sent to a first opposite-side device via PCIe optical-fiber links of the quantity N corresponding to the light transceiving module, and N is a positive integer greater than or equal to 2;

a controller 105 configured for determining a first-signal-intensity sequence corresponding to a first auxiliary signal, and according to the first-signal-intensity sequence, regulating amplitudes of the driving currents of a quantity M corresponding to the first-signal-intensity sequence among the driving currents of the quantity N, whereby the amplitudes of the driving currents of the quantity M and first signal intensities of the quantity M have a one-to-one correspondence relation therebetween, wherein the first-signal-intensity sequence comprises the first signal intensities of the quantity M, M is a positive integer greater than or equal to 2 and less than or equal to N, and the first auxiliary signal is to be sent to the first opposite-side device; and a laser-generator array 102 configured for, according to the driving currents of the quantity N, obtaining first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

By using the light transceiving module, the signal intensities of the optical signals of the quantity M among optical signals of the quantity N that transmit the first data signal are changed according to the signal-intensity sequence corresponding to the auxiliary signal, and subsequently the auxiliary signal is transmitted by using the signal-intensity sequence corresponding to the signal intensities of the optical signals of the quantity M, whereby, when auxiliary information is transmitted in the PCIe optical-fiber links, it is not required to use additional photoelectric components and optical-fiber channels. In addition, by using the signal intensities of the optical signals of the quantity M to transmit the auxiliary signal, the disadvantages of the poor anti-interference performance and the increased bit error rate caused by a single channel pilot tone modulation technique are prevented, and the diversity of the combination of the signal intensities of the optical signals of the quantity M may support the transmission of more diverse auxiliary signals, which solves the problem that auxiliary information cannot be transmitted in the PCIe optical-fiber links well.

In an illustrative embodiment, FIG. 3 is a first schematic structural diagram of a light transceiving module according to an embodiment of the present application. As shown in FIG. 3, the light transceiving module further comprises:

a photodiode array 104 configured for, in response to second optical signals of the quantity N sent by the first opposite-side device having been acquired, converting second optical signals of the quantity M that are predetermined among second optical signals of the quantity N into electric-current signals of the quantity M;

a transimpedance amplifier 103 configured for converting the electric-current signals of the quantity M into voltage signals of the quantity M; and a detector 106 configured for detecting signal intensities of the voltage signals of the quantity M; and according to second signal intensities of the quantity M obtained by the detection, determining a second-signal-intensity sequence, and according to the second-signal-intensity sequence, determining a second auxiliary signal, wherein the second auxiliary signal is an auxiliary signal sent by the first opposite-side device.

It should be noted that the above modules may be implemented by software or hardware. The latter may be implemented in the following modes but is not limited thereto: all of the above modules are located in the same one processor, or the above modules are located in different processors in any combinations.

An embodiment of the present application further provides a non-volatile readable storage medium, wherein the non-volatile readable storage medium stores a computer program, and the computer program is configured for, when being executed, implementing the steps according to any one of the process embodiments stated above.

In an illustrative embodiment, the non-volatile readable storage medium may include but is not limited to various media that can store a computer program, such as a USB flash disk, a Read-Only Memory (referred to for short as ROM), a Random Access Memory (referred to for short as RAM), a mobile hard disk drive, a diskette and an optical disk.

An embodiment of the present application further provides an electronic device, wherein the electronic device comprises a memory and a processor, the memory stores a computer program, and the processor is configured for executing the computer program to implement the steps according to any one of the process embodiments stated above.

In an illustrative embodiment, the electronic device may further comprise a transmitting device and an inputting-outputting device, wherein the transmitting device is connected to the processor, and the inputting-outputting device is connected to the processor.

The examples in the present embodiment may refer to the examples described in the above embodiments and illustrative embodiments, and are not discussed further in the present embodiment.

Apparently, a person skilled in the art should understand that the modules or steps described above according to the present application may be embodied by using generic computing devices. They may be concentrated in a single computing device, or distributed in a network formed by a plurality of computing devices. They may be embodied by using a program code executable by a computing device, whereby they may be stored in a storing device and executed by the computing device. Furthermore, in some cases, the illustrated or described steps may be executed in sequences different from the sequences used herein, or they may be separately fabricated into integrated-circuit modules, or a plurality of modules or steps among them may be fabricated into a single integrated-circuit module to be embodied. Accordingly, the present application is not limited to any particular combination of hardware and software.

The above are merely alternative embodiments of the present application, and are not indented to limit the present application. For a person skilled in the art, the present application may have various modifications and variations. Any modifications, equivalent substitutions and improvements that are made within the principle of the present application should fall within the protection scope of the present application.

The invention claimed is:

1. A signal sending method, wherein the method comprises:

acquiring a first data signal and a first auxiliary signal that are to be sent to a first opposite-side device, wherein the first data signal is to be sent to the first opposite-side device via PCIe (Peripheral Component Interconnect Express) optical-fiber links of a quantity N, wherein N is a positive integer greater than or equal to 2;

determining a first-signal-intensity sequence corresponding to the first auxiliary signal, wherein the first-signal-intensity sequence comprises first signal intensities of a quantity M, wherein M is a positive integer greater than or equal to 2 and less than or equal to N; and according to the first-signal-intensity sequence, converting the first data signal into first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

2. The method according to claim 1, wherein the step of determining the first-signal-intensity sequence corresponding to the first auxiliary signal comprises:

acquiring configuration information, wherein the configuration information contains signal-intensity sequences corresponding to different auxiliary signals, wherein the auxiliary signals include the first auxiliary signal, and the signal-intensity sequences include the first-signal-intensity sequence; and based on the configuration information, determining the first-signal-intensity sequence corresponding to the first auxiliary signal.

3. The method according to claim 1, wherein the step of, according to the first-signal-intensity sequence, converting the first data signal into the first optical signals of the quantity N comprises:

by using a laser-light driver, according to the first data signal, determining driving currents of the quantity N;

according to the first-signal-intensity sequence, regulating amplitudes of the driving currents of the quantity M corresponding to the first-signal-intensity sequence among the driving currents of the quantity N, whereby the amplitudes of the driving currents of the quantity M and the first signal intensities of the quantity M have a one-to-one correspondence relation therebetween; and by using a laser-generator array, according to the driving currents of the quantity N, obtaining the first optical signals of the quantity N.

4. The method according to claim 1, wherein the method further comprises:

in response to second optical signals of the quantity N sent by the first opposite-side device having been acquired, according to the second optical signals of the quantity M that are predetermined among the second optical signals of the quantity N, determining a second-signal-intensity sequence corresponding to the second optical signals of the quantity M; and according to the second-signal-intensity sequence, determining a second auxiliary signal, wherein the second auxiliary signal is an auxiliary signal sent by the first opposite-side device.

5. The method according to claim 1, wherein the step of, according to the first-signal-intensity sequence, converting the first data signal into the first optical signals of the quantity N comprises:

by using light transceiving modules of a quantity P, according to the first-signal-intensity sequence, converting the first data signal into the first optical signals of the quantity N, wherein a sum of quantities of the PCIe optical-fiber links corresponding to the light transceiving modules of the quantity P is greater than or equal to N, a sum of quantities of the PCIe optical-fiber links of a quantity P-1 among the light transceiving modules of the quantity P is less than N, and P is a positive integer greater than or equal to 1.

6. The method according to claim 1, wherein the method further comprises:

in response to a target light transceiving module that sends the first optical signals of the quantity N corresponding to the PCIe optical-fiber links of a quantity X, and a third data signal and a third auxiliary signal that are to be sent to a second opposite-side device existing, determining a third-signal-intensity sequence corresponding to the third auxiliary signal, wherein the third data signal is to be sent to the second opposite-side device via the PCIe optical-fiber links of a quantity Y, the third-signal-intensity sequence comprises third signal intensities of a quantity K, Y is a positive integer greater than or equal to 2, and X is a positive integer greater than or equal to N+Y, wherein K is a positive integer greater than or equal to 2 and less than or equal to Y; and by using the target light transceiving module, converting the third data signal into third optical signals of the quantity Y, and by using the PCIe optical-fiber links of the quantity Y, sending the third optical signals of the quantity Y to the second opposite-side device, wherein signal intensities of the third optical signals of the quantity K among the third optical signals of the quantity Y and the third signal intensities of the quantity K have a one-to-one correspondence relation therebetween.

7. The method according to claim 1, wherein the method further comprises:

in response to the first data signal being transmitted via 4 PCIe optical-fiber links, and M being 4, the first-signal-intensity sequence corresponding to the first auxiliary signal is [0, 1, 0, 1], wherein 0 is for indicating that a signal intensity is greater than a predetermined signal intensity, and 1 is for indicating that a signal intensity is less than or equal to the predetermined signal intensity.

8. The method according to claim 1, wherein the method further comprises:

carrying, by the first optical signals of the quantity N, the first data signal and the first auxiliary signal, obtaining, by the first opposite-side device, the first data signal according to the first optical signals of the quantity N, and according to the signal intensities of the first optical signals of the quantity M among the first optical signals of the quantity N, determining the first auxiliary signal.

9. The method according to claim 1, wherein the step of, according to the first-signal-intensity sequence, converting the first data signal into the first optical signals of the quantity N comprises:

by using one or more light transceiving modules, according to the first-signal-intensity sequence, converting the first data signal into the first optical signals of the quantity N, comprising:

in response to a quantity of the PCIe optical-fiber links of a single instance of the light transceiving modules being less than N, by using a plurality of instances of the light transceiving modules, according to the first-signal-intensity sequence, converting the first data signal into the first optical signals of the quantity N; and in response to a quantity of the PCIe optical-fiber links of a single instance of the light transceiving modules being greater than or equal to N, by using a single instance of the light transceiving modules, according to the first-signal-intensity sequence, converting the first data signal into the first optical signals of the quantity N.

10. A non-volatile readable storage medium, wherein the non-volatile readable storage medium stores a computer program, and the computer program, when executed by a processor, implements the steps of the method according to claim 1.

11. An electronic device, comprising a memory, a processor, and a computer program that is stored in the memory and executable in the processor, wherein the processor, when executing the computer program, implements the steps of the method according to claim 1.

12. The method according to claim 3, wherein the step of, according to the driving currents of the quantity N, obtaining the first optical signals of the quantity N comprises:

obtaining an i-th optical signal among the first optical signals of the quantity N in the following manner, to obtain the first optical signals of the quantity N:

according to data information corresponding to the first data signal carried by an i-th instance of the driving currents and an amplitude of the i-th driving current, modulating a light, to obtain the i-th optical signal.

13. The method according to claim 4, wherein the step of, according to the second optical signals of the quantity M that are predetermined among the second optical signals of the quantity N, determining the second-signal-intensity sequence corresponding to the second optical signals of the quantity M comprises:

by using a photodiode array, converting the second optical signals of the quantity M into electric-current signals of the quantity M, and by using a transimpedance amplifier, converting the electric-current signals of the quantity M into voltage signals of the quantity M;

detecting signal intensities of the voltage signals of the quantity M, to obtain second signal intensities of the quantity M; and according to the second signal intensities of the quantity M obtained by the detection, determining the second-signal-intensity sequence.

14. The method according to claim 4, wherein the step of, according to the second-signal-intensity sequence, determining the second auxiliary signal comprises:

acquiring configuration information, wherein the configuration information contains signal-intensity sequences corresponding to different auxiliary signals, wherein the auxiliary signals include the second auxiliary signal, and the signal-intensity sequences include the second-signal-intensity sequence; and based on the configuration information, determining the second auxiliary signal corresponding to the second-signal-intensity sequence.

15. The method according to claim 5, wherein the step of, by using the light transceiving modules of the quantity P, according to the first-signal-intensity sequence, converting the first data signal into the first optical signals of the quantity N comprises:

in response to P being greater than or equal to 2, by using the light transceiving modules of a quantity Z among the light transceiving modules of the quantity P, according to the first-signal-intensity sequence and the first data signal, obtaining the first optical signals of the quantity M among the first optical signals of the quantity N, wherein a sum of quantities of the PCIe optical-fiber links corresponding to the light transceiving modules of the quantity Z is greater than or equal to M, and Z is a positive integer greater than or equal to 1 and less than or equal to Q, wherein Q is a minimum value of P and M.

16. The method according to claim 12, wherein the step of, according to the data information corresponding to the first data signal carried by the i-th driving current and the amplitude of the i-th driving current, modulating the light comprises:

by using the data information carried by the i-th driving current, performing frequency modulation or phase modulation or polarization modulation to the light, and by using the amplitude of the i-th driving current, performing intensity modulation to the light.

17. The method according to claim 9, wherein the step of, by using the one or more light transceiving modules, according to the first-signal-intensity sequence, converting the first data signal into the first optical signals of the quantity N comprises:

in response to, at an emitting side and a receiving side of signals, 16 PCIe links being used to transmit the first data signal, directly by using 1 light transceiving module having 16 PCIe links, according to the first-signal-intensity sequence, converting the first data signal into 16 first optical signals, or, by using 2 light transceiving modules each having 8 PCIe links, according to the first-signal-intensity sequence, converting the first data signal into 16 first optical signals, or, by using 4 light transceiving modules each having 4 PCIe links, according to the first-signal-intensity sequence, converting the first data signal into 16 first optical signals.

18. A light transceiving module, wherein the light transceiving module comprises:

a laser-light driver configured for, according to a first data signal, determining driving currents of a quantity N, wherein the first data signal is to be sent to a first opposite-side device via PCIe (Peripheral Component Interconnect Express) optical-fiber links of the quantity N corresponding to the light transceiving module, and N is a positive integer greater than or equal to 2;

a controller configured for determining a first-signal-intensity sequence corresponding to a first auxiliary signal, and according to the first-signal-intensity sequence, regulating amplitudes of the driving currents of a quantity M corresponding to the first-signal-intensity sequence among the driving currents of the quantity N, whereby the amplitudes of the driving currents of the quantity M and first signal intensities of the quantity M have a one-to-one correspondence relation therebetween, wherein the first-signal-intensity sequence comprises the first signal intensities of the quantity M, M is a positive integer greater than or equal to 2 and less than or equal to N, and the first auxiliary signal is to be sent to the first opposite-side device; and a laser-generator array configured for, according to the driving currents of the quantity N, obtaining first optical signals of the quantity N, and via the PCIe optical-fiber links of the quantity N, sending the first optical signals of the quantity N to the first opposite-side device, wherein signal intensities of the first optical signals of the quantity M among the first optical signals of the quantity N and the first signal intensities of the quantity M have a one-to-one correspondence relation therebetween.

19. The light transceiving module according to claim 18, wherein the light transceiving module further comprises:

a photodiode array configured for, in response to second optical signals of the quantity N sent by the first opposite-side device having been acquired, converting second optical signals of the quantity M that are predetermined among second optical signals of the quantity N into electric-current signals of the quantity M;

a transimpedance amplifier configured for converting the electric-current signals of the quantity M into voltage signals of the quantity M; and a detector configured for detecting signal intensities of the voltage signals of the quantity M; and according to second signal intensities of the quantity M obtained by the detection, determining a second-signal-intensity sequence, and according to the second-signal-intensity sequence, determining a second auxiliary signal, wherein the second auxiliary signal is an auxiliary signal sent by the first opposite-side device.

* * * * *